United States Patent [19]

Oda et al.

[11] 4,020,646
[45] May 3, 1977

[54] DIFFUSION-ABSORPTION TYPE REFRIGERATING MACHINE

[75] Inventors: Hiroshi Oda, Okazaki; Hideki Fukunaga, Nagoya, both of Japan

[73] Assignee: Howa Sangyo Kabushiki Kaisha, Japan

[22] Filed: Feb. 26, 1976

[21] Appl. No.: 661,461

[52] U.S. Cl. .................................. 62/492
[51] Int. Cl.² ........................................ F25B 15/10
[58] Field of Search ............................ 62/490–493

[56] References Cited

UNITED STATES PATENTS

| | | | |
|---|---|---|---|
| 2,770,108 | 11/1956 | Backstrom | 62/492 |
| 2,999,368 | 9/1961 | Schomburg | 62/490 |
| 3,524,330 | 8/1970 | Kogel | 62/492 |
| 3,785,171 | 1/1974 | Beranek et al. | 62/490 |
| 3,874,193 | 4/1975 | Reistad | 62/490 |

*Primary Examiner*—Lloyd L. King
*Attorney, Agent, or Firm*—Ladas, Parry, Von Gehr, Goldsmith & Deschamps

[57] ABSTRACT

The evaporator of tubular form of a diffusion-absorption type refrigerating machine has an inlet part closed off from the outside and an outlet part contiguously joined to the tubular outer wall of heat-exchanger and discharges vaporized ammonia as a refrigerant through the heat exchanger to a liquid receiver, and a tube for conducting hydrogen gas as an auxiliary gas from the top of the absorber and another tube of smaller diameter for conducting liquid ammonia from the condenser extend, either side-by-side or with the tube of smaller diameter within the other tube, through the interiors of the heat exchanger and evaporator to the inlet part, where both tubes are open-ended and discharge their respective hydrogen gas and ammonia into the interior of the evaporator at its inlet end.

7 Claims, 8 Drawing Figures

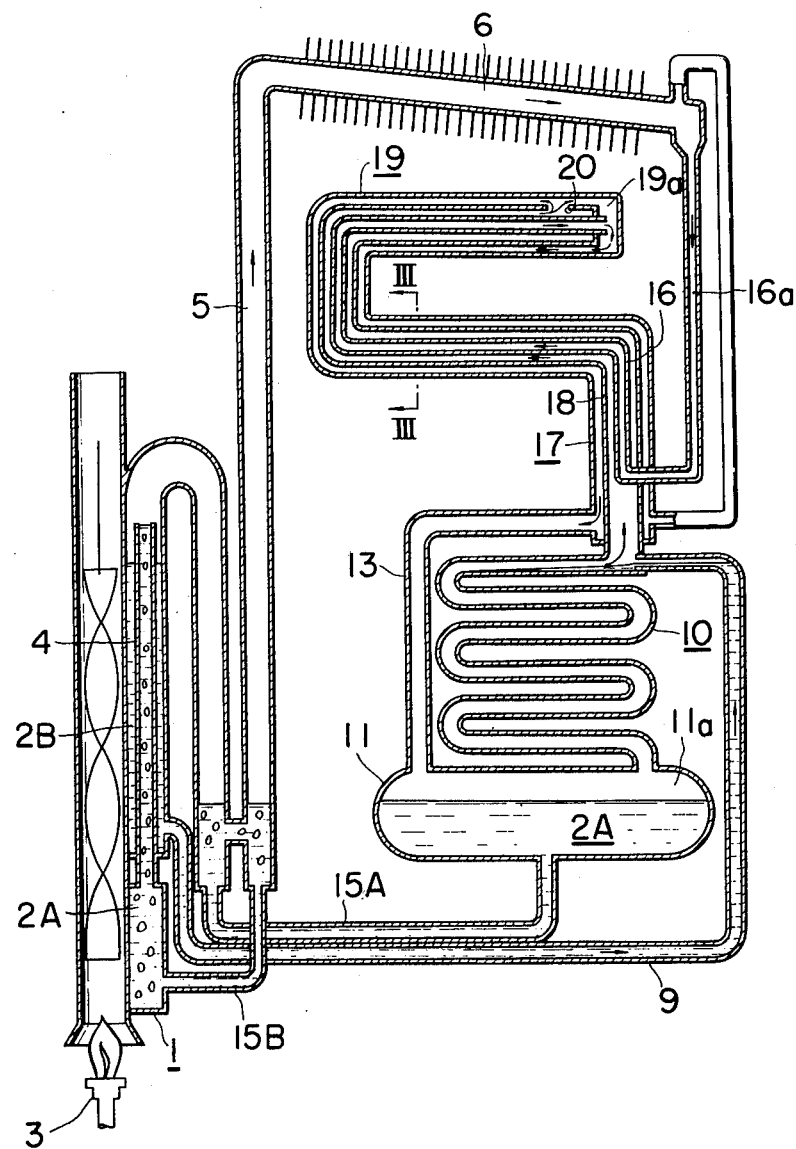
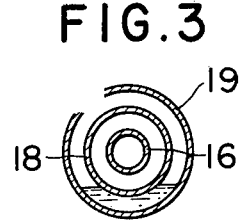
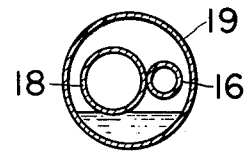

DIFFUSION-ABSORPTION TYPE REFRIGERATING MACHINE

BACKGROUND OF THE INVENTION

This invention relates generally to diffusion-absorption type refrigerating machines and more particularly to a diffusion-absorption type refrigerating machine in which refrigeration capacity loss due to auxiliary gas and refrigerant is small.

In known diffusion-absorption type refrigerating machines, the ammonia liquid which has condensed in the condenser flows into the evaporator in which it is evaporated as it mixes with hydrogen gas as an auxiliary gas. The mixture of the ammonia gas and hydrogen gas flows down through the evaporator into the liquid receiver and then flows upward through the absorber. As the mixture flows in the absorber, the ammonia gas is absorbed into a dilute ammonia solution flowing down the absorber and only the hydrogen gas rises back into the inlet of the evaporator. This rising hydrogen gas makes heat exchange in a heat exchanger with the mixture of the ammonia gas and the hydrogen which has been delivered from the evaporator, whereby the rising hydrogen gas is cooled by the mixture.

For the reasons to be set out hereinafter, it is desirable that the rising hydrogen be cooled as possible as it can in the heat exchanger. Moreover, it is also desirable that the ammonia liquid flowing from the condenser to the evaporator be cooled before it enters the evaporator.

However, in the known refrigerating machines of this type it has not been possible to fully cool the rising hydrogen and the ammonia liquid from the condenser, whereby a loss occurs in the refrigerating capacity of the refrigerating machines.

SUMMARY OF THE INVENTION

It is an object of this invention to overcome the above described difficulties associated with diffusion-absorption type refrigerating machines.

Another and more specific object of the invention is to provide a diffusion-absorption type refrigerating machine in which refrigeration capacity loss due to the auxiliary gas is greatly reduced, whereby the refrigeration performance of the machine is substantially increased.

Still another object of the invention is to provide a refrigerating machine in which the above stated object is achieved by a relatively simple structural arrangement particularly of the evaporator and associated heat exchanger.

According to this invention, briefly summarized, there is provided, in a diffusion-absorption refrigerating machine of the character referred to above, an improved structural arrangement in which the evaporator has an inlet part closed off from the outside and an outlet part contiguously joined to the tubular outer wall of a heat exchanger and discharges a vaporized refrigerant through the heat exchanger to a liquid receiver, and a tube for conducting an auxiliary gas from the top of the absorber and another tube of smaller diameter for conducting liquid refrigerant from the condenser extend, either side-by-side or with the tube of smaller diameter within the other tube, through the interiors of the heat exchanger and evaporator to the inlet part of the evaporator, where both tubes are open-ended and discharge their respective auxiliary gas and refrigerant into the interior of the evaporator at the inlet end thereof.

The nature, principle, utility, and further features of this invention will be more clearly apparent from the following detailed description with respect to preferred embodiments of the invention when read in conjunction with the accompanying drawings, throughout which like parts are designated by like reference numerals.

BRIEF DESCRIPTION OF THE DRAWINGS

In the drawings:

FIG. 2 is a similar diagram indicating the essential structural organization and operation of one example of a diffusion-absorption type refrigerating machine according to this invention;

FIG. 3 is an enlarged cross section taken along the plane indicated by line III—III in FIG. 2;

FIG. 4 is a view similar to FIG. 3 showing a modification of the arrangement within the evaporator of tubes for respectively conducting liquid refrigerant and auxiliary gas;

DETAILED DESCRIPTION

Figure 1:
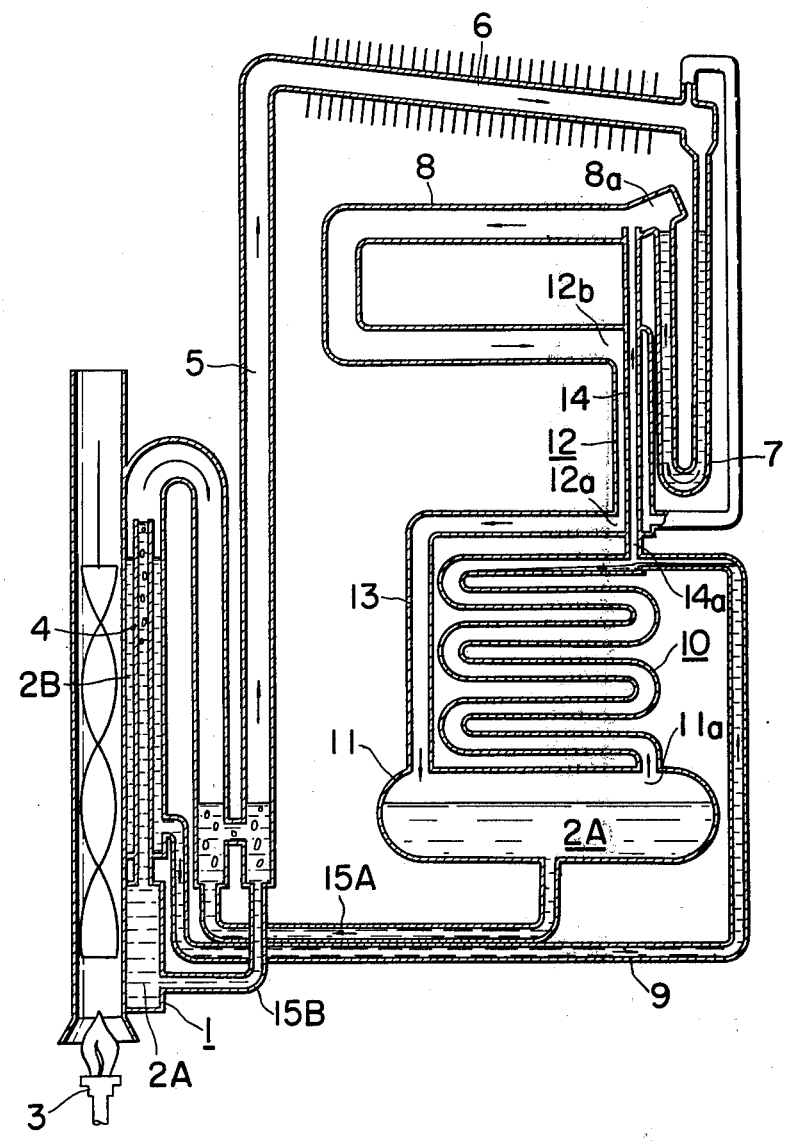
FIG. 1 is a schematic, layout and flow diagram indicating the essential structural organization and operation of one example of a known refrigerating machine of diffusion-absorption type.

In order to assist the understanding of the principle of this invention, a typical example of a known refrigerating machine of diffusion-absorption type will be described with reference to FIG. 1, in advance of the description of the preferred embodiments of this invention.

A concentrated solution or strong liquor of ammonia is heated in a generator 1 by a gas heater 3 or some other heat source such as an electric heater. The ammonia gas and liquid thus generated are lifted upward through a vertical lift tube 4 by the principle of an air bubble pump, and upon leaving the upper end of the lift tube 4, the ammonia gas passes through a rectifier 5 and reaches a condenser 6. Then, as this ammonia passes through the condenser 6, it liquefies or condenses and thereafter passes through a U-tube 7 to reach the inlet 8a of an evaporator 8. On one hand, the dilute ammonia solution 2B or weak liquor which has discharged the ammonia passes through a transfer pipe 9 and, reaching the top of an absorber 10, flows down therethrough to enter a liquid receiver 11.

The interior spaces of the evaporator 8 and the absorber 10 among the above ennumerated various components, other than the portions occupied by liquids are filled with hydrogen gas as an auxiliary gas, hydrogen gas being inert with respect to ammonia and water. The liquid ammonia flowing into the evaporator 8 undergoes an abrupt reduction in pressure and thereby begins to evaporate. This evaporating ammonia thereby has a refrigerating effect as it diffuses into the hydrogen gas. The resulting gas mixture of ammonia and hydrogen flows through a heat exchanger 12 and, flowing through a vertical pipe 13, enters the liquid receiver 11. This gas mixture further passes through the upper space 11a of the interior of the liquid receiver 11 and, rising through the absorber 10, contacts the dilute solution of ammonia flowing downward from above. As a result, only the ammonia is absorbed by this liquid, and the hydrogen gas rises through the absorber 10.

In this manner, the hydrogen gas passed from the absorber 10, through a tube 14 within the heat exchanger 12, and into the evaporator 8, where it mixes with the ammonia within this evaporator 8. The resulting gas mixture flows into the heat exchanger 12 and enters the liquid receiver 11. This circulation of the hydrogen gas continues naturally because the specific gravity of the gas mixture of ammonia and hydrogen is greater than the specific gravity of the hydrogen gas within the absorber 10. The concentrated ammonia solution 2A within the liquid receiver 11 returns progressively by way of pipes 15A and 15B to the generator 1.

As a result of the continuation of the above described operation, the refrigeration chamber within which the evaporator 8 is installed is cooled, and its temperature decreases. During this operation, however, in the heat exchange between the hydrogen gas rising through the tube 14 in the heat exchanger 12 and the gas mixture descending in the region around the tube 14, a difference between the theoretical heat exchange quantity and the actual heat exchange quantity, that is, a heat loss, inevitably occurs, and this heat loss increases with increase in the gravimetric circulation rate of the auxiliary gas.

However, when the ammonia functioning as the refrigerant is to evaporate in the hydrogen gas functioning as an auxiliary gas, for example, at −20° C, it is necessary that the partial pressure of the ammonia be, actually, lower than 1.94 atmospheres, absolute, which is the saturation pressure thereof at −20° C. For obtaining a low partial pressure, an increase in the gravimetric circulation rate of the hydrogen gas constituting the auxiliary gas becomes necessary.

A lowering of performance due to this reason is a drawback of diffusion-absorption type refrigerating machines. This drop in performance can be expressed as a heat loss quantity $\Delta Q$ as follows:

$$\Delta Q = C_p (GH - GH') (t - t')$$

where,
Cp is the isobaric specific heat of the auxiliary gas in Kcal./kg. ° C;
GH is the theoretical gravimetric circulation rate of the auxiliary gas in kg./hr.;
GH' is the actual gravimetric circulation rate of the auxiliary gas in kg./hr.;
$t$ is the temperature of the auxiliary gas at the inlet part 14a of the tube 14 in ° C; and
$t'$ is the temperature of the auxiliary gas at the outlet 12a of the heat exchanger 12 in ° C. The refrigerant partial pressure in an actual refrigerating machine is reduced to a value of the order of from ½ to ⅓ of the saturation pressure, and for this reason the heat loss quantity is of a magnitude of from 1/5 to ⅓ of the total cooling capacity.

Furthermore, one of the possible causes for impediment to the lowering of the evaporation temperature in the evaporator 8 is considered to be insufficient lowering of the temperature of the auxiliary gas in the heat exchanger 12. More specifically, the hydrogen gas as the auxiliary gas which passes through the tube 14 within the heat exchanger 12 and enters the evaporator 8, even if it undergoes maximum temperature drop, will not be cooled to a temperature lower than that of the gas mixture at the inlet part 12b of the heat exchanger 12. For this reason, the temperature of the auxiliary gas arriving at the inlet of the evaporator 8 is, naturally, higher than the temperature within the evaporator 8, and this auxiliary gas contributes to the cooling only after it has been cooled to the temperature of the evaporator 8 as a result of the cooling capacity of this evaporator. This thermal state is the same with respect to the refrigerant liquid supplied through the U-tube 7 to the inlet of the evaporator 8.

In FIG. 2, there is illustrated a preferred embodiment of this invention. While no difference exists in the fundamental refrigeration cycle between the diffusion-absorption type refrigerating machine of the invention as illustrated in FIG. 2 and succeeding figures and the known diffusion-absorption type refrigerating machine described hereinabove with reference to FIG. 1, the refrigerating machine of the invention differs in the construction of the evaporator and that of the heat exchanger successively following the evaporator from any heretofore known refrigerating machine, as will be apparent, from the following detailed description.

The concentrated ammonia solution 2A is heated in the generator 1 by a heater 3, and the ammonia gas and liquid thus generated are cuased to rise by the lift tube 4, the ammonia being sent through the rectifier 5 to the condenser 6.

On one hand, the dilute ammonia solution 2B, which has discharged ammonia, passes through the transfer pipe 9 and the absorber 10 and enters the liquid receiver 11.

In accordance with this invention, the refrigerant which has condensed in passing through the condenser 6 flows through a tube 16 corresponding to the U-tube 7 in the known machine.

This tube 16 has a vertical downward-flow part 16a which starts from the outlet of the condenser 6 and is bent at its lower end, and this bent part is introduced into the interior of a tube 18 disposed within a heat exchanger 17 in the form of a large-diameter tube, the tube 16 being inserted through the walls of the heat exchanger 17 and the tube 18.

The tube 18 corresponds to the aforedescribed tube 14 constituting the inner tube of the heat exchanger 12 in FIG. 1. This tube 18 serves as a rising passageway for the hydrogen gas, i.e., the auxiliary gas, rising from the interior of the absorber 10. In the known machine, the upper end of the tube 14, which has passed longitudinally through the heat exchanger 12, is connected, together with the U-tube 7, to the inlet of the evaporator 8. In contrast, the tube 18 in the instant embodiment of the invention is inserted coaxially through an evaporator 19 in the form of a large-diameter tube having a closed construction at an end inlet 19a thereof. Near this inlet 19a of the evaporator, the tube 18 has an opening 20 communicating the interior of the tube 18 with the interior of the evaporator 19.

Thus, the auxiliary gas, i.e., the hydrogen gas, which undergoes heat exchange within the heat exchanger 17 with the gas mixture of the refrigerant gas and the auxiliary gas flowing through the heat exchanger 17 is caused to contribute to heat exchange by utilizing the evaporator 19 also as a heat exchanger.

On one hand, the aforementioned tube 16 inserted through the tube 18 is thus inserted coaxially therethrough not only within the heat exchanger 17 but also within the evaporator 19 and, passing through the extreme end wall of the tube 18, communicates with the above mentioned end inlet 19a of the evaporator 19.

In addition, the gas mixture of the ammonia and hydrogen passes from the heat exchanger 17 through the vertical pipe 13 and enters the liquid receiver 11. Then, as this gas mixture, passing through the upper space 11a within the liquid receiver 11, rinses through the absorber 10, it contacts the dilute ammonia solution flowing downward therethrough, and only the ammonia in this gas mixture is absorbed by the weak liquor, while the hydrogen gas rises and is sent through the aboe mentioned tube 18 to the evaporator 19. The weak ammonia liquor 2B which has discharged ammonia in the generator 1 passes through the transfer pipe 9 and reaches the absorber 10. The strong ammonia liquor in the liquid receiver 11 passes successively through the pipes 15A and 15B and thus returns to the generator 1. These operational actions and the structural arrangement of the machine for accomplishing these actions are the same as in the known machine.

The operational effectiveness of the diffusion-absorption type refrigerating machine of this invention and the utility thereof are as follows.

The ammonia gas generated in the generator 1 passes through the rectifier 5 and enters the condenser 6, where it condenses. The resulting liquid ammonia flows through the tube 16.

On one hand, as is apparent from the foregoing description, the hydorgen gas flowing upward from the absorber 10 flows through the tube 18.

The ammonia liquid constituting the regrigerant liquid and flowing through the tube 16 and the hydrogen gas constituting the auxiliary gas and flowing through the tube 18 thus flow in the same direction through the interior of the evaporator 19 and thereafter flow out into the interior of the inlet part 19a of the evaporator. The ammonia liquid then flows as it evaporates through the evaporator 19 toward the heat exchanger 17 and mixes with the hydrogen gas, and the resulting gas mixture passes through the heat exchanger 17. During this action, a cooling effect is obtained, and, at the same time, heat exchange between the refrigerant and the auxiliary gas is accomplished.

Accordingly, by the aforedescribed structural arrangement of the refrigerating machine according to this invention, the effective heat-exchanging area of the heat exchanger 17 becomes extremely large, and the difference ($t - t'$) in the equation set forth hereinbefore for calculation of heat loss quantity becomes very small. For this reason the heat loss due to the auxiliary gas becomes remarkably small.

Furthermore, because of the presence of the tube 18 within the evaporator 19, a vigorous turbulent flow occurs within the evaporator, whereby the evaporation of the refrigerant is promoted, and the difference between the theoretical and actual values of the refrigerant partial pressure becomes small. Accordingly, a small gravimetric circulation rate of the auxiliary gas is sufficient, and a great reduction in heat loss is realized. Particularly since the temperatures of the refrigerant liquid and the auxiliary gas entering the evaporator 19 have been lowered to values in the vicinity of the evaporation temperature, the cooling performance becomes remarkable higher than that of a conventional refrigerating machine of the same class.

Figure 6:
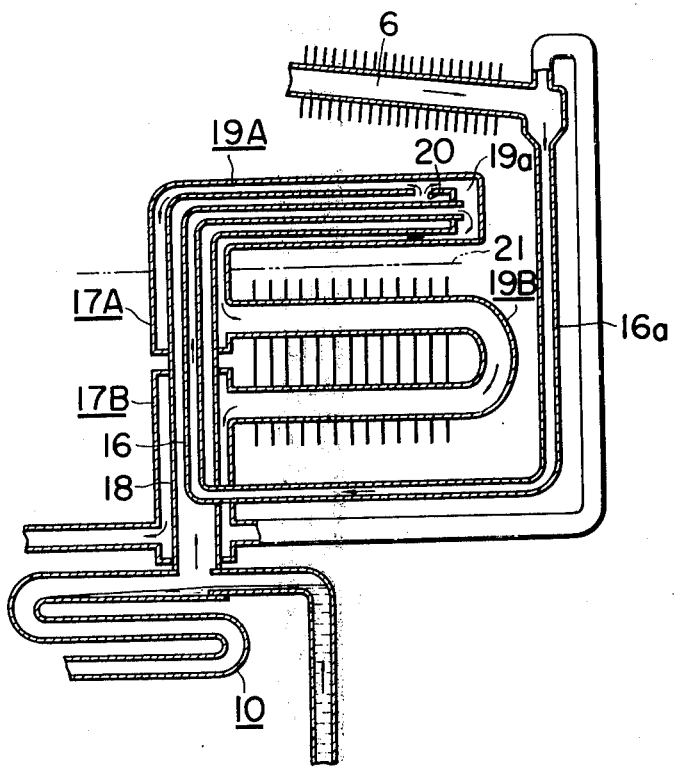
FIG. 6 is a fragmentary schematic, layout and flow diagram indicating the essential structural organization and operation of another example of the diffusion-absorption refrigerating machine according to this invention.

In a second embodiment of the invention as illustrated in FIG. 6, the structural arrangement of the heat exchanger and the evaporator is basically similar to that of the preceding embodiment shown in FIG. 2 in that the tube 16 conducting the liquid refrigerant extends through the interior of the tube 18 conducting the axuxiliary gas, and the tube 18 extends through a large-diameter tues 17B and 17A constituting the outer casing of the heat exchanger and a tubular evaporator 19A joined contiguously to the heat exchanger part 17A.

The embodiment shown in FIG. 6 differs from the preceding example in that, at an intermediate part of the heat exhanger, a tubular detour 19B is provided to constitute a high-temperature evaporator, which is extended into the interior of a high-temperature refrigeration compartment of a refrigerator, for example. This hightemperature evaporator 19B is provided around its exterior with fins. The upper evaporator 19A functions as a low-temperature evaporator, which is extended into another refrigeration compartment separated by a partition wall 21 to be cooled to a lower temperature. The tubes 16 and 18 do not pass through the detouring evaporator 19B but extend directly from the heat exchanger part 17B to the part 17A. Accordingly, the liquid refrigerant entering the inlet part 19a of the low-temperature evaporator 19A undergoes a first-stage evaporation as it passes through this evaporator and then undergoes a secondstage evaporation as it passes through the high-temperature evaporator 19B.

Figure 7:
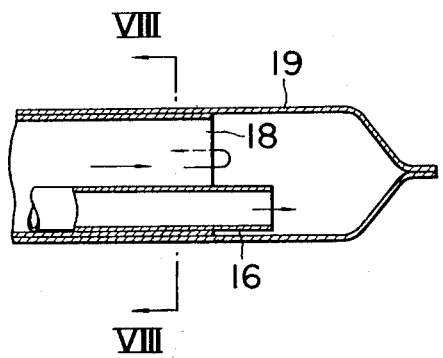
FIG. 7 is an enlarged side view, in longitudinal section, showing the inlet part of the evaporator of the refrigerating machine of this invention and indicating the practical manner in which the inlet end of the evaporator is closed off from the outside by merely flattening and sealing.

While, in the above described embodiments of this invention, the tubes 16 and 18 respectively for conducting therethrough the liquid refrigerant and the auxiliary gas have been described and illustrated in FIGS. 2, 3, and 7 as being of concentric or coaxial disposition within the evaporator 19, this invention is not intended to be limited to such a structural arrangement. For example, as illustrated in FIG. 4, the tubes 18 and 16 can be placed side-by-side and in contact with each other within the evaporator 19.

Figure 5:
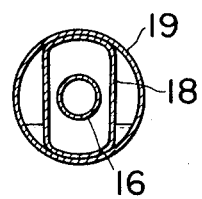
FIG. 5 is a view similar to FIGS. 3 and 4 showing a further modification of the arrangement within the evaporator of the two tubes.

In still other arrangements, as shown in FIG. 5, the tube 18 has a flattened cross section with substantially straight vertical sides and arcuate upper and lower ends, which are in contact with the inner wall surface of the evaporator 19, with the tube 16 disposed coaxially within the tube 18. This structural arrangement affords good contact between the regrigerant liquid and the tube 18, thereby contributing to high heat exchange rate.

Figure 8:
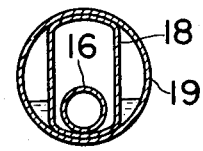
FIG. 8 is a cross section similar to FIGS. 3, 4 and 5, taken along the plane indicated by line VIII—VIII in FIG. 7.

In still another and practical modification of the preceding embodiments of the invention, as indicated in FIG. 8, the extremity of the tubular structure of the evaporator at its inlet and is formed by merely pressing it flat into a planar lap joint, which is sealed by a suitable method such as welding or brazing. This simple structural feature greatly facilitates fabrication and assembly of the evaporator and associated parts without impairing the operational performance thereof. As is apparent from FIG. 8, the tube 16 used in the modification shown in FIG. 7 is in contact with the inner wall surface of the tube 18 at the lower end thereof.

Thus, as described in the foregoing disclosure, this invention provides a refrigerating machine of diffusion-absorption type of simple construction which can be produced with relative ease, and which can accomplish refrigeration with high performance as a result of high heatexchange in its evaporator and heat exchanger.

I claim:

1. In a refrigerating machine of diffusion-absorption type having a liquid receiver containing a concentrated solution of a refrigerant, an absorber communicating at one end thereof with the receiver, a condenser, a heat exchanger, an evaporator having an inlet part and an outlet part communicating through one passageway of the heat exchanger to the receiver, a first tube for conducting the refrigerant in condensed liquid form from the condenser to said inlet part of the evaporator, and a second tube for conducting an auxiliary gas from the other end of the absorber through another passageway of the heat exchanger to said inlet part; the improvement in which said inlet part of the evaporator is closed off from the outside, said second tube is disposed within and extends coaxially through the heat exchanger and the evaporator and is open-ended at said inlet part to the interior of the evaporator, and said first tube is disposed within and extends through said second tube and is open-ended at said inlet part to the interior of the evaporator.

2. The improvement as set forth in claim 1 in which the heat exchanger is divided into two parts and respectively having separated outer walls, the interiors of said outer walls being communicatively joined by a detouring tubular structure constituting a second evaporator for refrigeration at a relatively high temperature, said first and second tubes extending directly from one part to the other part of the heat exchanger and not through said second evaporator, and the evaporator part having said inlet part constitutes a first evaporator for refrigeration at a relatively low temperature.

3. The improvement as set forth in claim 1 in which said inlet part of the evaporator is of substantially tubular form which is closed off from the outside by flattening to form a lap joint lying in a single plane and sealed.

4. The improvement as set forth in claim 1 in which the evaporator and the first and second tubes are all substantially of circular cross section and are coaxially disposed relative to each other, the first tube extending coaxially through the second tube.

5. The improvement as set forth in claim 1 in which the second tube has a cross-sectional shape with flattened vertical side walls and substantially arcuate top and bottom walls in close contact with opposite inner wall parts of the evaporator, and the first tube is disposed substantially coaxially within the second tube.

6. The improvement as set forth in claim 1 in which the second tube has a cross-sectional shape with flattened vertical side wall and substantially arcuate top and bottom walls in close contact with opposite inner wall parts of the evaporator, and the first tube is disposed within the second tube in contact with the inner surface of the bottom wall of the second tube.

7. The improvement as set forth in claim 1 in which said first tube is coaxial with said second tube.

* * * * *